Oct. 17, 1933.  E. A. ROCKWELL ET AL  1,930,662
VEHICLE BRAKE ASSEMBLY
Filed June 6, 1929  4 Sheets-Sheet 2

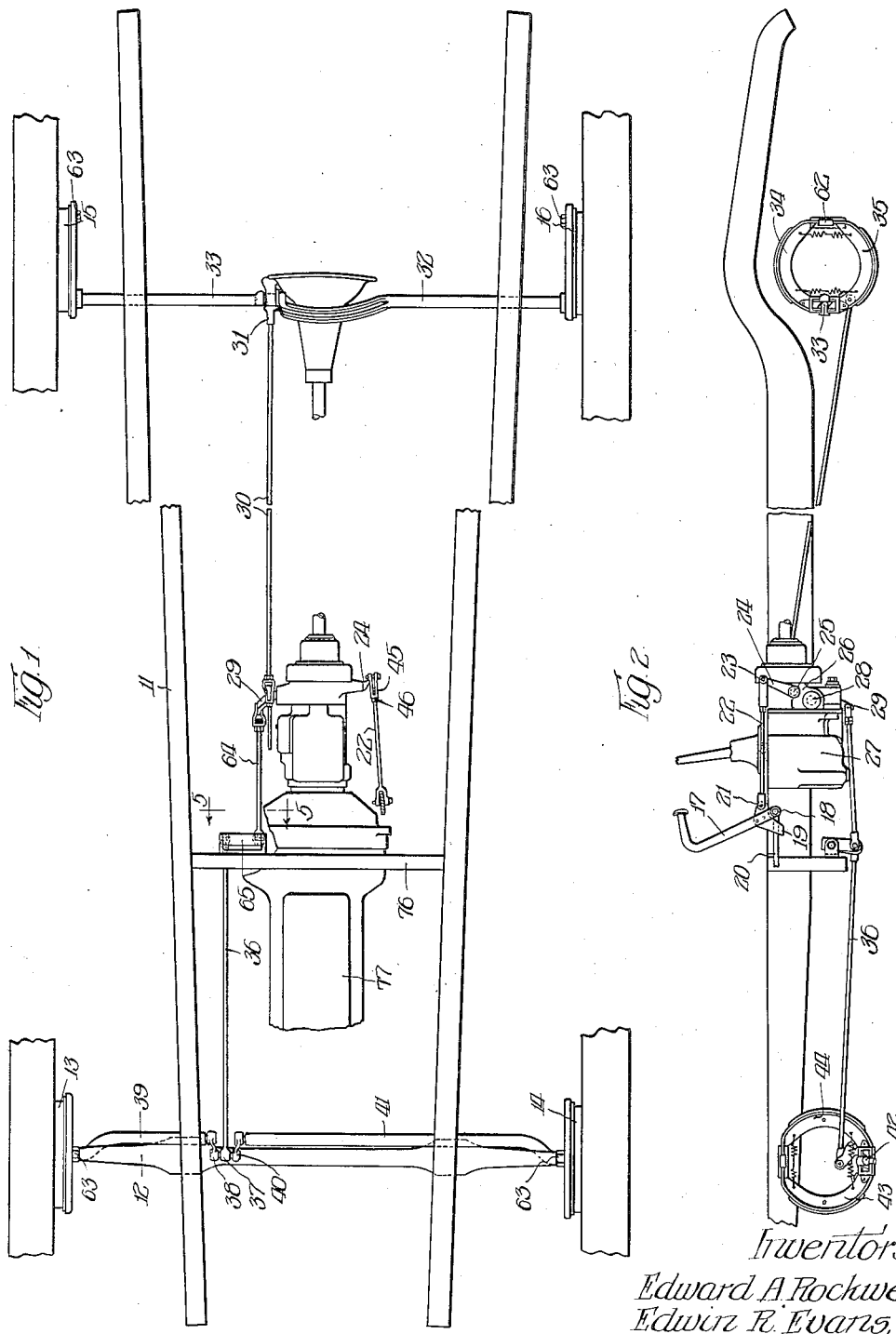

Inventors:
Edward A. Rockwell,
Edwin R. Evans,
By Wilkinson Huxley Byron & Knight
Attys.

Oct. 17, 1933.  E. A. ROCKWELL ET AL  1,930,662
VEHICLE BRAKE ASSEMBLY
Filed June 6, 1929   4 Sheets-Sheet 3
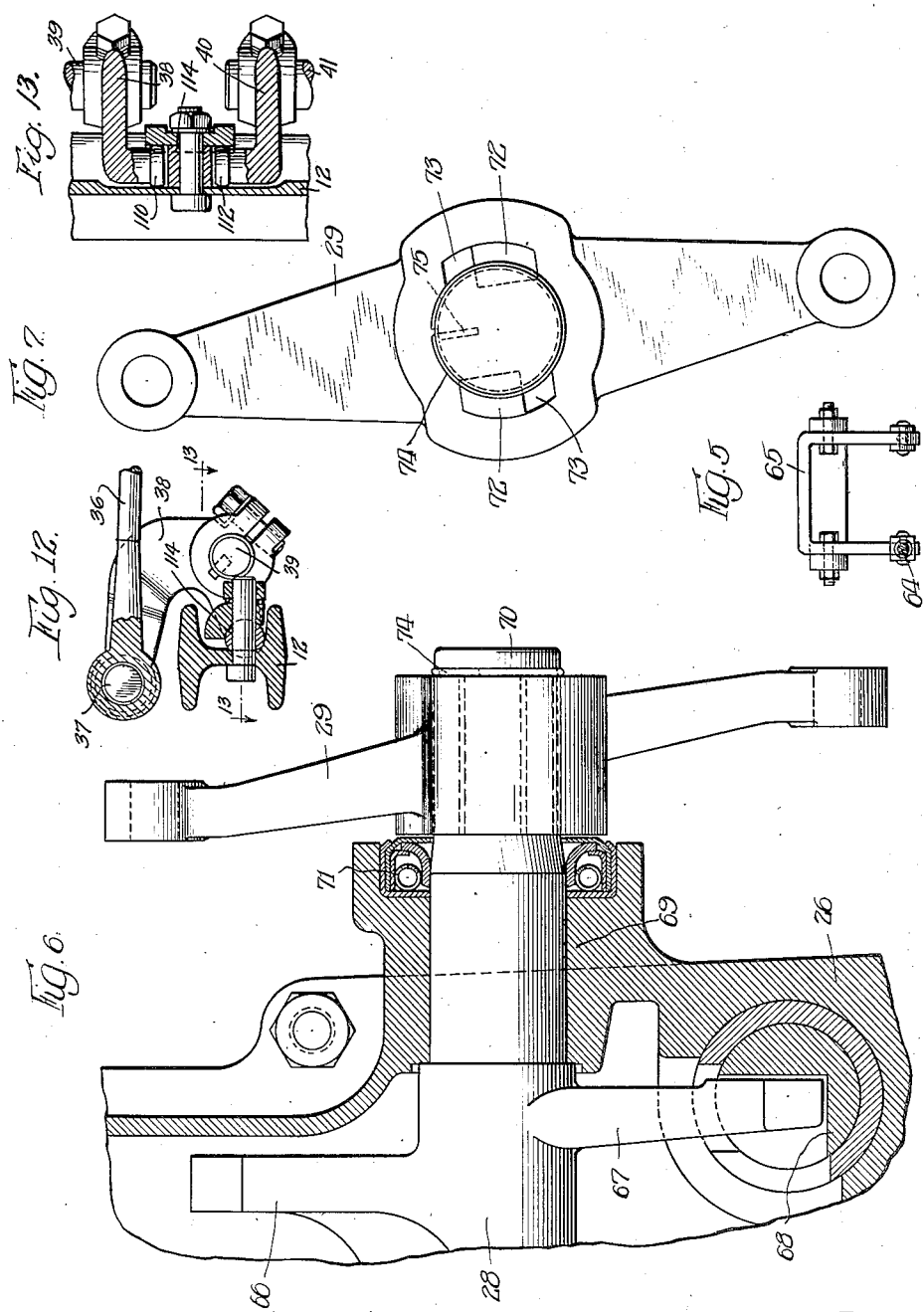
Inventors
Edward A. Rockwell,
Edwin R. Evans,
By Wilkinson Huxley Byron & Knight
Attys.

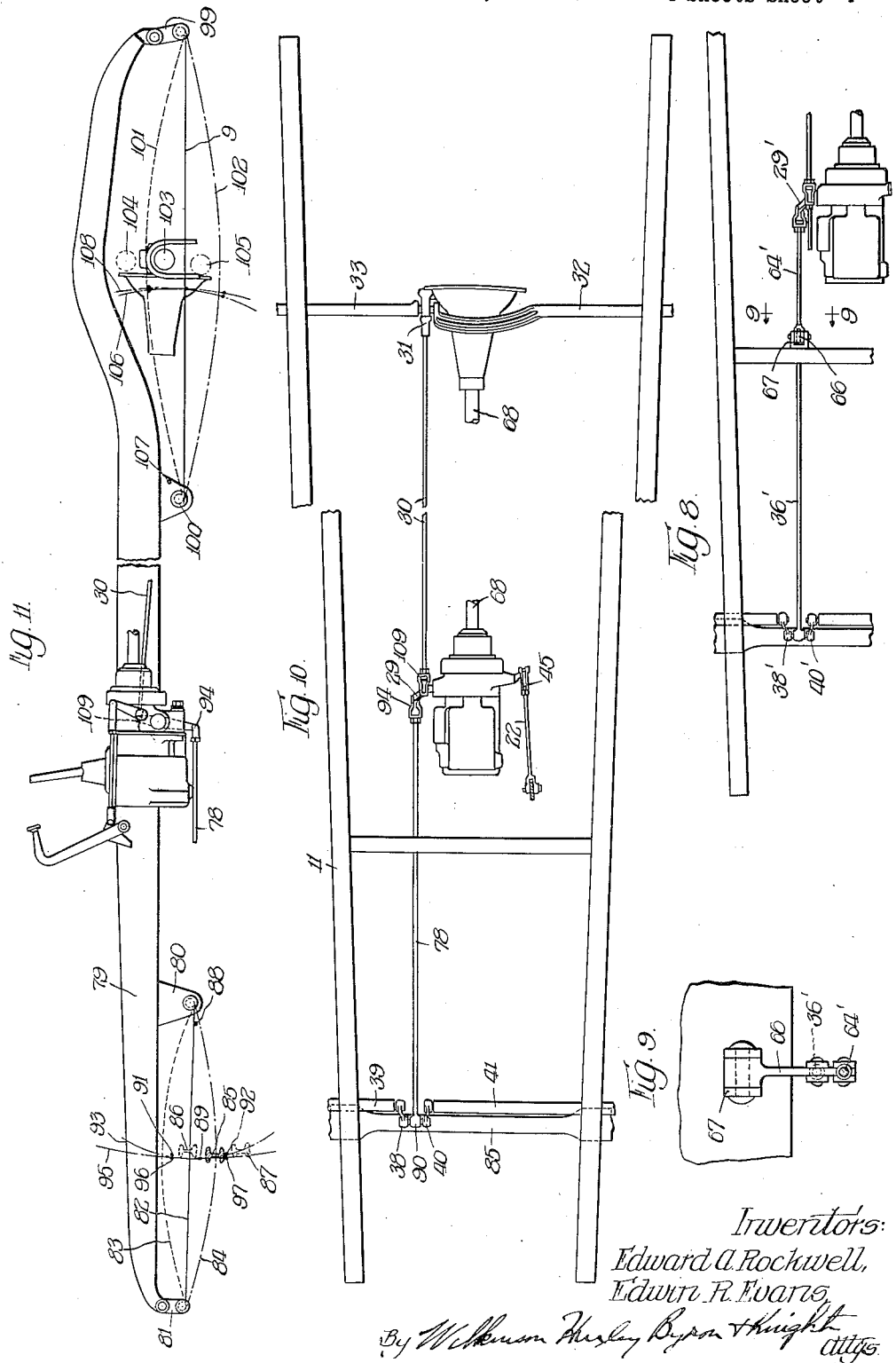

Patented Oct. 17, 1933

1,930,662

UNITED STATES PATENT OFFICE 1,930,662

VEHICLE BRAKE ASSEMBLY

Edward A. Rockwell and Edwin R. Evans, Chicago, Ill.

Application June 6, 1929. Serial No. 368,768

5 Claims. (Cl. 188—10)

This invention relates to a new and improved vehicle brake assembly and more particularly to brake operating members and linkage especially adapted for use in connection with a power device for applying the braking force.

It is an object of the present invention to provide brake operating means for association with a power device or the like.

It is a further object to provide means of this character further equipped with manual brake applying means for operation independently of the power device.

It is an additional object to provide a rigid brake system with but four points of adjustment.

It is also an object to provide a construction in which the brake assemblies may be mounted on the axles and connected to the operating mechanism carried by the chassis by a single connecting means from each of the front and rear axles.

It is a further object to provide a construction in which all of the brakes if applied tend to release on bound and rebound of the springs.

It is also an object to provide a brake linkage for such use which is simple in design and adapted for application to existing types of vehicle structure without material alteration therein.

Other and further objects will appear as the description proceeds.

We have shown a preferred embodiment of our invention in the accompanying drawings, in which—

Figure 1 is a plan view of a motor vehicle chassis partly broken away, showing the application of our braking system thereto;

Figure 2 is a side elevation of the construction of Figure 1;

Figure 5 is a fragmentary view showing a relay taken on line 5—5 of Figure 1;

Figure 6 is a fragmentary section on an enlarged scale showing the double brake lever assembly.

Figure 7 is a face view of the lever of Figure 6;

Figure 8 is a fragmentary plan view showing a modified form of relay;

Figure 9 is a section taken on line 9—9 of Figure 8;

Figure 10 is a plan view, partly broken away, showing a modified form of assembly;

Figure 11 is a side elevation of a chassis, partly broken away, and with the spring movement indicated diagrammatically thereon, and Figure 12 is a detail vertical section taken longitudinally of the vehicle and illustrating the connection of the brake pull rod to the front brake cross shafts, and Figure 13 is a section taken on the plane indicated 13—13 in Figure 12.

Figure 3:
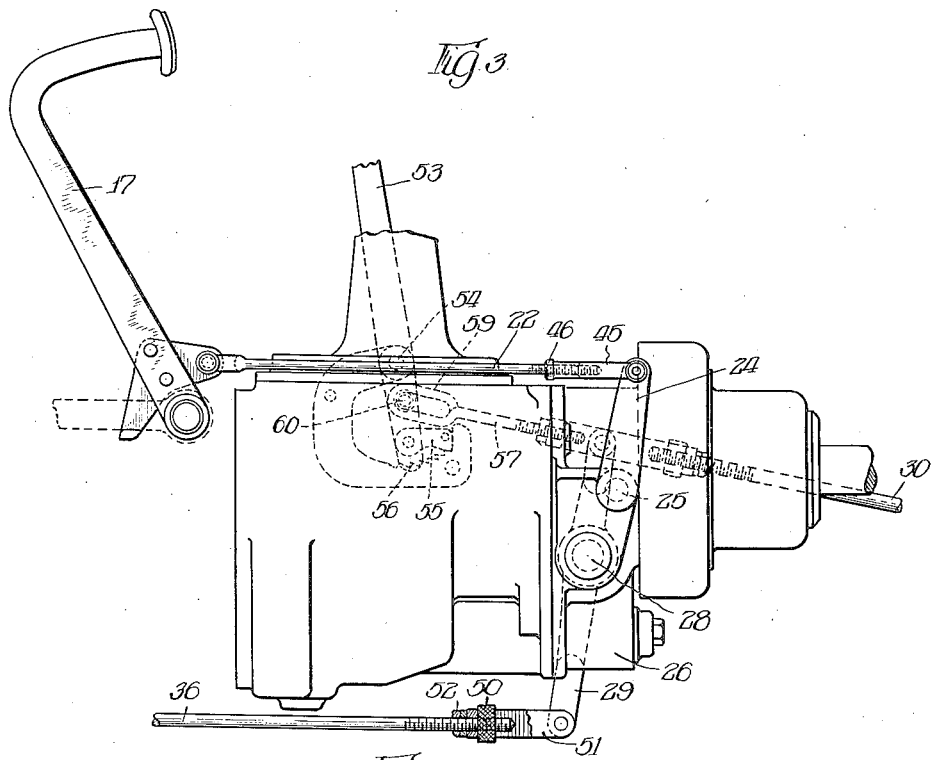
Figure 3 is a fragmentary side elevation on an enlarged scale showing the connections for applying power to the braking linkage.

Referring first to Figures 1 and 2, the vehicle is provided with the chassis frame 11, front axle 12 and front brake drums 13 and 14. It is also provided with the rear brake drums 15 and 16. The brake pedal 17 is pivoted at 18 to a fixed support and is provided with a stop 19 for engaging a frame member 20 to limit its return movement. The rear side of the foot pedal is pivotally connected at 21 to an adjustable link 22, the opposite end of which is pivotally connected at 23 to a lever 24 which serves to operate the power device for power operation of the braking mechanism. This lever arm 24 is pivoted at 25 to a cross shaft carried in an extension 26 of the gear casing 27. This extension 26 carries the power device, which receives its power from the propeller shaft 68. The details of this power device form no part of the present invention and are therefore not disclosed herein since they are described in detail in the copending application of Rockwell, Serial No. 371,109, filed June 15, 1929 Patent No. 1,882,926, issued October 18, 1932.

The shaft 28 is operated by the power device and has a double lever 29 secured to its end on the side opposite to the brake pedal side of the mechanism. This lever 29 has its upper end connected by pull rod 30 with the coupling member 31, which is adapted to transmit power to the rear brake operating shafts 32 and 33 pivotally carried by the rear axle of the vehicle. The pull rod 30 may be connected to the shafts 32 and 33 and the shafts may be pivotally supported on the rear axle in a manner similar to the disclosure in Figures 12 and 13 of the connection to the front brake cross shafts and supports therefor as more fully described hereinafter. As shown in Figure 2, the shaft 32 is provided with a cam 33' adapted to separate the brake shoes 34 and 35 and force them into engagement with the brake drum. The brake operating shaft 33 operates a similar brake mechanism in the drum 15. The construction of the brake shoe assembly includes an adjustable pivot 62 which is adjusted by the exterior nut 63 to move the shoes toward or away from the brake drums. The lower end of the lever 29 has a pull rod 64 secured thereto which pull rod is connected through the relay 65 to the pull rod 36. This relay is hung from the cross frame member 76 which supports the rear end of the engine 77. This latter rod 36 is connected by the coupling 37 to the lever arm 38, actuating the front brake shaft 39 and similarly connected to the arm 40 actuating the opposite front brake shaft 41. The brake shaft 41 is provided with an operating cam 42 shown in Figure 2, which serves to separate the brake shoes 43 and 44 and force them into engagement with the brake drum 14. A similar mechanism is provided in the opposite brake drum 13. The front brake operating cross shafts 39 and 41 are pivotally supported by the front axles adjacent to their connected ends.

The manner of pivotally supporting the inner ends of the cross shafts 39 and 41 upon the axle 12 is illustrated in Figures 12 and 13 and is more fully described and specifically claimed in the copending applications of Evans, Serial No. 29,587, filed May 11, 1925, and Serial No. 367,590, filed May 31, 1929. It will be noted that the levers 38 and 40, which are rigidly secured to the inner ends of the shafts 39 and 41, have ball-shaped ends 110 and 112 universally supported on the axle 12 by the bearing members 114 removably secured to the axle.

Figure 4:
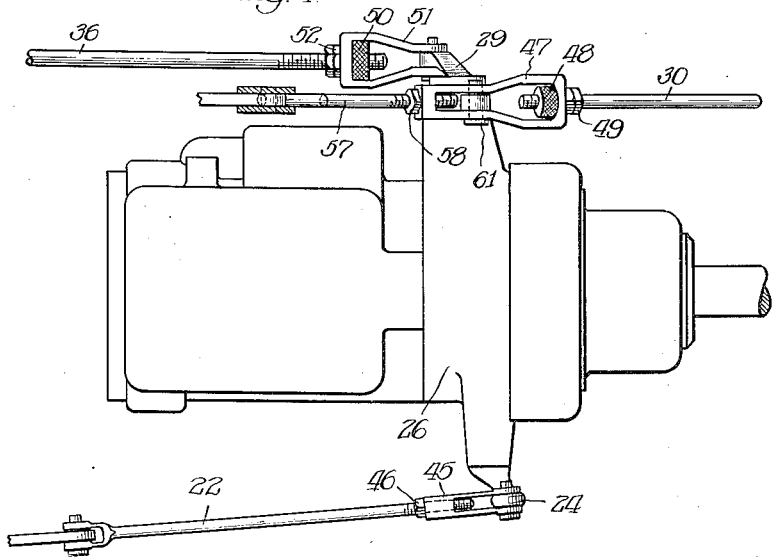
Figure 4 is a plan view of Figure 3.

The construction is shown more in detail in Figures 3 and 4, and it will be noted that the adjustable link 22 is threaded into the sleeve 45 and locked in place by the lock nut 46. This permits adjustment between the brake pedal and the power operating lever 24. The rear brake pull rod 30 is connected to the coupling member 47 by means of a knurled nut 48 threaded upon the end of the pull rod inside the coupling member. The lock nuts 49 are provided for locking the pull rod in adjusted position.

The pull rod 36 is similarly connected to the bottom of the lever 29 by means of a knurled nut 50 threaded on the end of the pull rod inside the connecting yoke 51. The lock nuts 52 are provided for maintaining the adjustment. The hand brake lever 53 is pivoted at 54 and is provided with a pawl 55 which coacts with a rack 56 to lock the lever in adjusted position. The link 57 is threaded into the coupling member 47 and is provided with the lock nut 58 to hold it in adjusted position. The opposite end of the link 57 is formed with an elongated eye 59 which is fitted upon a pin 60 carried by the hand lever 53 at a point below its pivot 54. The coupling member 47 is pivoted upon the upper end of the lever 29 by means of the pin 61.

The lever 29 and its method of connection to the power shaft 28 are shown in Figures 6 and 7. The shaft 28 has power supplied to it through the arms 66 by means of a power mechanism the detailed construction of which forms no part of the present invention. The arm 67 coacts with a dash pot piston 68 to control the rocking movement of the shaft 28. The shaft 28 is carried in the bearing 69 in the housing 26, and is provided with the reduced end 70 upon which the double lever 29 is fitted. The packing 71 is provided to prevent leakage of oil from the bearing 69.

As best shown in Figure 7 the end portion 70 is cut away upon opposite sides to provide seats for the two buttress keys 72. The double lever 29 is provided with the opposed recesses 73 to receive the buttress keys 72, these recesses being of greater circumferential extent than the buttress keys so as to permit a limited angular play of the lever 29 on the shaft 28. The lever 29 is turned in a clockwise direction as seen in Figure 7, in order to apply the brakes. As shown in this figure, the keys 72 abut the clockwise ends of the recesses 73 and this is the normal relation of the parts when the brakes are fully released, power being supplied through shaft 28 to turn the lever 29. In the event of the use of the emergency or parking brake lever 53, shown in Figure 3, the power is applied through link 57 to the upper end of lever 29 and this lever may turn freely on end 70 of shaft 28 to the extent necessary to apply the brakes without the counterclockwise ends of recesses 73 engaging the buttress keys 72. The hand brake may be used, therefore, without turning shaft 28 and consequently a failure of the power device or binding of parts in the power device will not affect the hand brake. It will be noted that there is a direct pull through from the hand lever to the rear wheel brakes by means of the member 47.

The double lever 29 is retained in place upon the reduced end 70 of the cross shaft 28 by means of the snap ring 74, which is seated in the circumferential groove on the end portion 70. The ring 74 is also provided with a down turned end 75 which is seated in a drilled hole in the shaft to aid in positioning the ring.

In the form of construction shown in Figures 8 and 9, a simple single lever relay 66 is provided instead of the double arm relay of Figures 1, 2 and 3. The single lever 66 is pivotally supported at 67 and has connected thereto the pull rod 36' leading to the brake shaft lever arms 38' and 40'. The link 64' is also connected to the lever 66 and has its other end connected to the double lever 29'. It will be understood that the length of the lever 66 and the points at which the pull rods and links are pivoted thereto may be varied to suit different designs of chassis and brake layouts.

The form of construction shown in Figures 10 and 11 is generally similar to that shown in the preceding figures with the exception that the front wheel brake shafts are directly connected to the double brake lever by means of a single pull rod 78 without any relay. In Figure 11 the chassis frame 79 is shown as provided with the front spring anchor bracket 80 and the front spring shackle 81, the latter being located at the front end of the frame. The normal position of the front springs has been shown by the full line 82, the bound position or that which the spring takes when the chassis is depressed toward the ground is shown by the broken line 83 and the rebound position is indicated by the dot and dash line 84. It will be understood that these lines are diagrammatic only and will vary within certain limits with different types of springs and with other variable factors.

The normal position of the front axle is shown at 85, the bound position at 86 and the rebound position at 87. While the spring is anchored at the rear end to 80 and shackled at the front end to 81, the front axle does not move in a true arc about the anchor pivot as the spring is not a rigid member free to pivot about the anchor point. The spring varies in thickness or number of leaves at different points which modifies its curvature and the movement is affected by the other end of the spring and the shackle connection. The axle 85 actually moves on a line which is substantially that of a circular arc struck with the point 88 as a center.

The normal position of the connection 90 between the brake pull rod 78 and the brake shaft lever arms 38 and 40 is shown on figure 11 at the point 89, above the normal position of the axle 85. The bound position of the upper ends of the lever arms 38 and 40 is shown at 91 and the rebound position at 92, assuming that the movement of the lever arms 38 and 40 with the axle is not otherwise restrained. All of these positions are on an arc 93 struck with the point 88 as a center.

The pull rod 78 pivots about its point of connection 94 with the double lever 29 and the connector end 90 tends to swing on the arc 95. This would place the connector end 90 at the point 96, on bound and at the point 97 on rebound, if not otherwise restrained. It will be apparent that an error is introduced. Assuming that the brakes are fully released, the brake actuating cams and the linkage connections will be brought to fully released positions by the action of the usual pull-back springs in the wheel brakes and acting on the linkage. As previously explained this will bring the lever 29 into abutment with the buttress keys 72 carried by the output rock shaft 28 of the power brake unit. While the brakes are fully released, the spring bound and rebound will have a tendency to slightly displace the cams from their normal positions in directions reverse to the direction of normal brake applying movement but this tendency to slightly displace the cams will be opposed by the pull-back springs in the wheel brakes and, instead, the rod 78 will buckle slightly so that actual movement of the cams, if any, is very slight and ineffective to produce any braking action of the brake shoes. However, if the brakes are partially applied, the pull rod 78 will be under tension and spring bound and rebound will have a tendency to slightly release the brakes instead of further applying them, due to the fact that the tension in the pull rod 78 will be relaxed and the rod may buckle slightly, thereby moving the upper ends of the lever arms 38 and 40 from points 96 or 97 to points 91 or 92. It will be apparent that this movement is a releasing movement if the brakes are partially applied. This construction therefore prevents any locking of the brakes due to spring bound and rebound while the brakes are being applied by the usual pedal pressure.

The rear brake connections and the spring suspension are also designed so that the error tends to release the brakes rather than to apply them. The normal spring line is shown at 98, the spring being shackled at 99 and pivoted at 100. The bound spring position is indicated by the broken line 101 and the rebound position by the dot and dash line 102. The normal axle position is shown at 103, the bound position at 104 and the rebound position at 105. The brake connection moves along the arc 106 as indicated, this arc having the point 107 as its center. The connector 31 on the end of the rear pull rod 30 tends to move on the arc 108 about the pivot point 109 at the upper end of the double lever 29. It will be seen therefore that the rear brakes also tend to release on bound or rebound.

In operation of the brakes by the linkage shown, pressure upon the foot pedal 17 serves to pull on the link 22 and rock the arm 24 in counterclockwise direction, this movement being transmitted to the shaft 25. This movement of shaft 25 serves to put the power device in operation and to cause the shaft 28 and, consequently the lever 29, to rock, also in counterclockwise direction. This counterclockwise movement of the lever 29 serves to pull on both the rear brake pull rod 30 and the front brake pull connection shown in different forms in Figures 1, 8 and 10. The pull upon these connections serves to apply all four brakes.

During this rocking movement of lever 29 the link 57 is moved toward the pin 60 on the hand brake lever and this movement is permitted by the lost motion due to the elongated eye 59 on the link. All four brakes may be applied independently of the foot lever and power device by rocking the hand lever 53 in clockwise direction about its pivot 54. This serves to cause the pin 60 to pull on the link 57 and the pull is transmitted through the coupling member 47 to the upper end of the lever 29, which is thus caused to rock about its axis in counterclockwise direction. It is, therefore, possible to apply all four brakes even should the power device be inoperative or fail to act. Therefore, a broken connection between the foot pedal and the power actuating device will not prevent adequate braking. Further, any breakage of the shaft 28 or the lever 29 will not prevent the application of braking power to the rear wheels since the power from the hand brake will pass directly through link 57 and coupling member 47 to the rear pull rod. A rupture of either pull rod or of any part beyond the pull rod will not prevent application of power to the remaining two brakes.

It will therefore be apparent that a break occurring at any one point of the braking system cannot put out of action more than two of the four brakes, and if occurring at any one of many points in the system will merely prevent the power operation of the braking system without affecting the manual operation of all four brakes.

The brake system shown is rigid throughout without equalizers or other yielding means. The only adjustments of the braking effect are made by means of the adjusting nuts 63, one of which is located on each of the four wheels. These nuts serve to adjust the clearance between the shoes and drums when the brakes are released. The adjusting nuts and lock nuts on the pull rods are provided to set the system up tightly but do not constitute a means for adjusting the brakes. The brake shafts are carried by the axles and may be assembled with the axles to form a complete axle and brake assembly independent of the chassis, these brake assemblies being only connected to the chassis carried parts by a single pull connection.

While we have shown one preferred form of our invention by way of illustration, it is capable of change and modification to adapt it to varying conditions and different vehicle structures, and we contemplate such changes and modifications as come within the spirit and scope of the appended claims.

We claim:

1. A brake system for motor vehicles comprising, front and rear axles, front and rear sets of brakes, a pair of front brake operating cross shafts pivotally supported by the front axle of the vehicle, a rear brake operating cross shaft associated with the rear axle of the vehicle, a power brake unit mounted on the propeller shaft of the vehicle, a transverse output rock shaft extending from the power brake unit, a double arm brake lever mounted on said shaft with provision for lost motion with respect thereto, a single pull rod extending between said front brake cross shafts and one arm of said brake lever, a single pull rod extending from the other arm of said brake lever to the rear brake cross shaft, means for bringing said power brake unit into action whereby rotation of said rock shaft turns said brake lever and actuates said front and rear brakes and auxiliary means for actuating said brake lever independent of movement of said rock shaft.

2. A substantially rigid combined power and manually controlled brake system for motor vehicles comprising, front and rear axles, front and rear sets of brakes, a pair of front operating cross shafts each including at one end a brake actuating cam, said cross shafts being pivotally supported by the front axle of the vehicle adjacent their inner ends, a pair of rear brake operating cross shafts having brake actuating cams on their outer ends and pivotally supported by the rear axle of the vehicle adjacent their inner ends, a power brake unit mounted on the propeller shaft adjacent the transmission of the vehicle, a transverse output rock shaft extending from the power brake unit, a double arm brake lever mounted on said shaft with provision for lost motion with respect thereto, a single pull rod extending forwardly from one arm of said brake lever for actuating said front brakes, a single pull rod extending rearwardly from the other arm of said brake lever for actuating said rear brakes, means for bringing said power brake unit into action whereby said brake lever is actuated by the movement of said rock shaft and auxiliary means for actuating said brake lever independent of movement of said rock shaft, said auxiliary means comprising a pivotally supported hand lever connected to one arm of said brake lever in line with the rearwardly extending pull rod.

3. A brake assembly for motor vehicles comprising in combination, front wheels, front wheel brakes, a front axle, front springs supported by said axle, a vehicle chassis frame supported on said front springs, said springs being pivotally anchored at their rear ends to said chassis frame, brake applying cross shafts supported on the front axle and connected to said front wheel brakes, brake applying means carried by the chassis frame and a brake applying pull rod pivotally connected at its forward end to at least one of said brake cross shafts and pivotally connected at its rear end to the brake applying means at such point that the normal arc of movement of its forward end on spring bound or rebound tends to swing forwardly of the normal arc of movement of the cross shafts carried by the axle.

4. A brake assembly comprising in combination, front wheels, front wheel brakes, a front axle, front springs supported on said front axle, a vehicle chassis frame supported on said front springs, said springs being pivotally anchored at their rear ends to said chassis frame, brake applying cross shafts supported on the front axle and connected to said front wheel brakes, brake applying means carried by the chassis frame, a single pull rod connected at its forward end to both of said brake cross shafts and pivotally connected at its rear end to the brake applying means at such point that the normal arc of movement of its forward end on spring bound or rebound tends to swing forwardly of the normal arc of movement of the cross shafts carried by the axle.

5. A brake assembly comprising in combination, front and rear wheels, front and rear axles, front and rear springs supported by said axles, a vehicle chassis frame supported on said springs, said springs being pivotally anchored to the chassis frame at their ends towards the center of the chassis frame, brake applying cross shafts carried by the front and rear axles, brake applying means carried by the chassis frame, a single pull rod between the brake applying means and the front cross shafts, a single pull rod between the brake applying means and the rear cross shafts, said pull rods being pivotally connected to said brake applying means at such points that the normal arc of movement of the forward end of the front brake pull rod under spring bound or rebound tends to swing forwardly of the cross shafts carried by the front axle and the normal arc of movement of the rear end of the rear pull rod tends to swing rearwardly of the normal arc of movement of the cross shafts carried by the rear axle.

EDWARD A. ROCKWELL.
EDWIN R. EVANS.